United States Patent [19]

Teter et al.

[11] Patent Number: 5,530,312

[45] Date of Patent: Jun. 25, 1996

[54] MULTI-CYCLE ELECTRIC MOTOR SYSTEM

[75] Inventors: Jospeh P. Teter, Mt. Airy; Arthur E. Clark, Adelphi, both of Md.

[73] Assignee: The United States of America as represented by the Secretary of the Navy, Washington, D.C.

[21] Appl. No.: 494,141

[22] Filed: Jun. 22, 1995

[51] Int. Cl.⁶ .................................................. H02N 2/00
[52] U.S. Cl. ................................................ 310/328; 310/26
[58] Field of Search ........................... 310/323, 328, 310/26

[56] References Cited

U.S. PATENT DOCUMENTS

| | | |
|---|---|---|
| 4,355,638 | 10/1982 | Iwatschenko et al. ............. 128/214 F |
| 4,845,688 | 7/1989 | Butler ............................... 367/174 |
| 4,994,698 | 2/1991 | Kliman et al. ..................... 310/326 |
| 5,025,183 | 6/1991 | Fuschetto .......................... 310/20 |
| 5,079,471 | 1/1992 | Nygren .............................. 310/328 |
| 5,404,066 | 4/1995 | Moriwaki et al. ................. 310/328 |

FOREIGN PATENT DOCUMENTS 6269178  9/1994  Japan ...................................... 310/328

*Primary Examiner*—Thomas M. Dougherty
*Attorney, Agent, or Firm*—Jacob Shuster

[57] ABSTRACT

The active elements of magnetostrictive and piezoelectric actuators undergo cyclic elongation and contraction in out-of-phase relation to each other when energized by the same electric power supply to exert push/pull forces during four cycle phases of an operational sequence to impart continuous, unidirectional propulsion to a driven member.

13 Claims, 6 Drawing Sheets

MULTI-CYCLE ELECTRIC MOTOR SYSTEM

BACKGROUND OF THE INVENTION

This invention relates to an electric motor system having plural actuators which undergo cyclic deformation to generate propulsion forces.

Electric motor systems of both the rotary and linear propulsion types which embody magnetostrictive actuators are already known in the art, as disclosed for example in U.S. Pat. Nos. 5,039,894 and 5,041,751, respectively issued Aug. 13 and 20, 1991 to Teter et al. and Clark et al. Piezoelectric actuators are also known in the art, as disclosed for example in U.S. Pat. No. 5,378,382, issued Jan. 3, 1995 to Nishimura et al.

It is an important object of the present invention to provide a solid state type of electric motor having actuators made of electrically deformable material that are cyclically deformed under electrical control for smoother operation.

SUMMARY OF THE INVENTION

In accordance with the present invention a motor system having a stator and driven member is provided with at least one pair of magnetostrictive and piezoelectric actuators which operate in 90° out-of-phase relation to each other when energized by excitation current from the same electrical power supply. During a first cycle phase of operation, elongation of the active element of the magnetostrictive actuator occurs in response to the excitation current to exert a push force, followed by a push force exerted during the next cycle phase by elongation of the active element of the piezoelectric actuator. During sequentially following third and fourth cycle phases, an operational sequence is completed by a pair of magnetostrictive and piezoelectric actuators undergoing contraction to exert pull forces. The push and pull forces are converted by one-way roller devices, engaging the stator and driven member, into unidirectional propulsion of the driven member without interruption in transfer of motion imparting force thereto.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein.

Figure 3:
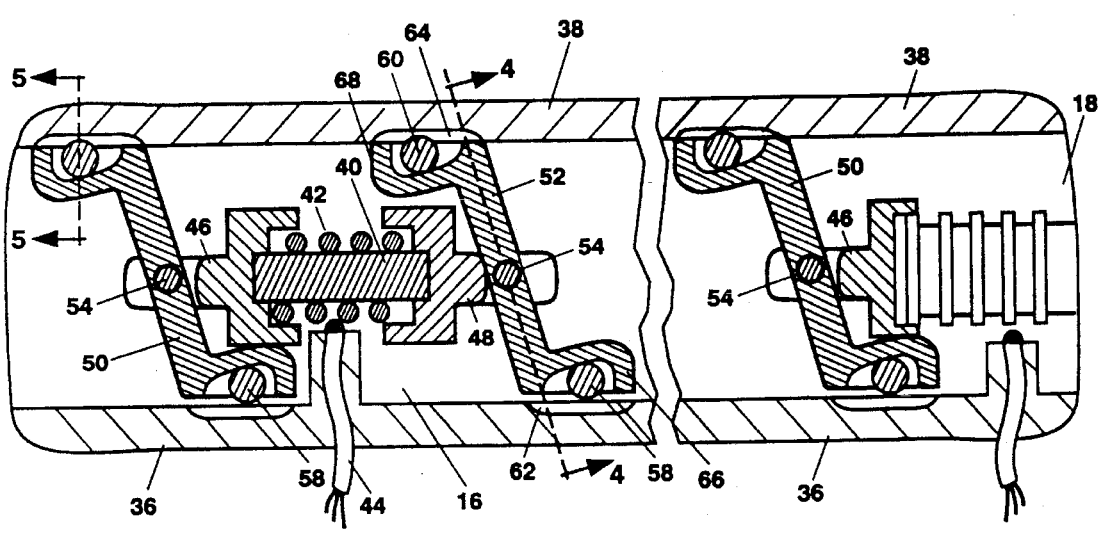
FIG. 3 is a partial side section view through a linear propulsion type of motor constructed in accordance with one embodiment of the invention diagrammed in FIGS. 1 and 2.
Figure 4:
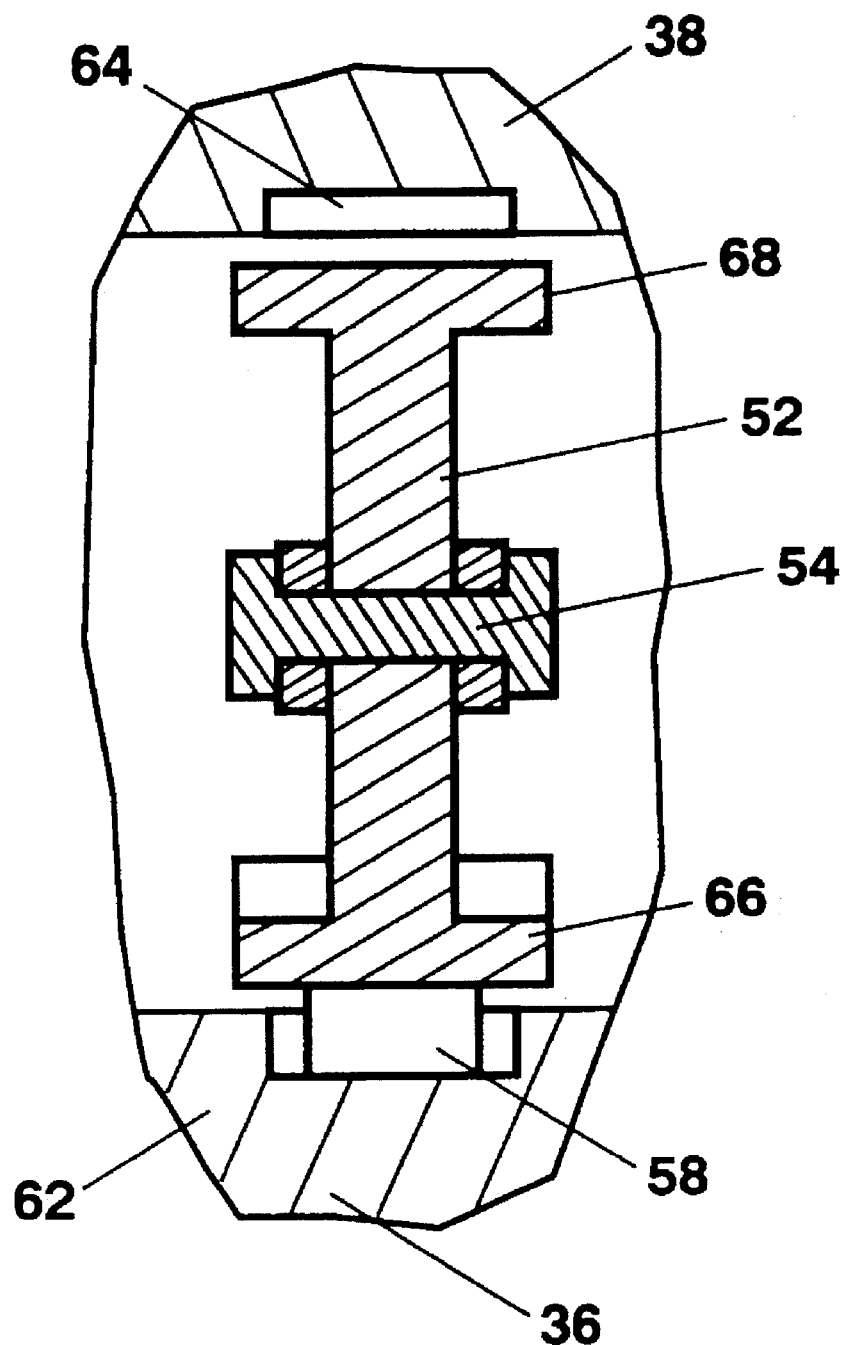
Figure 5:
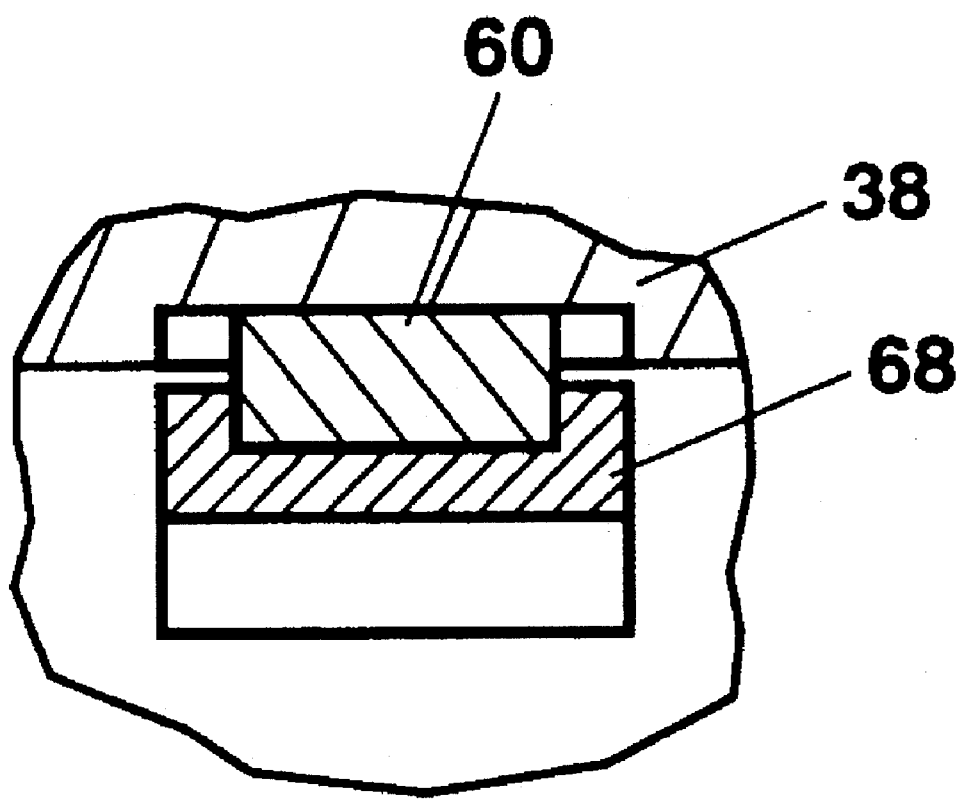
Figure 6:
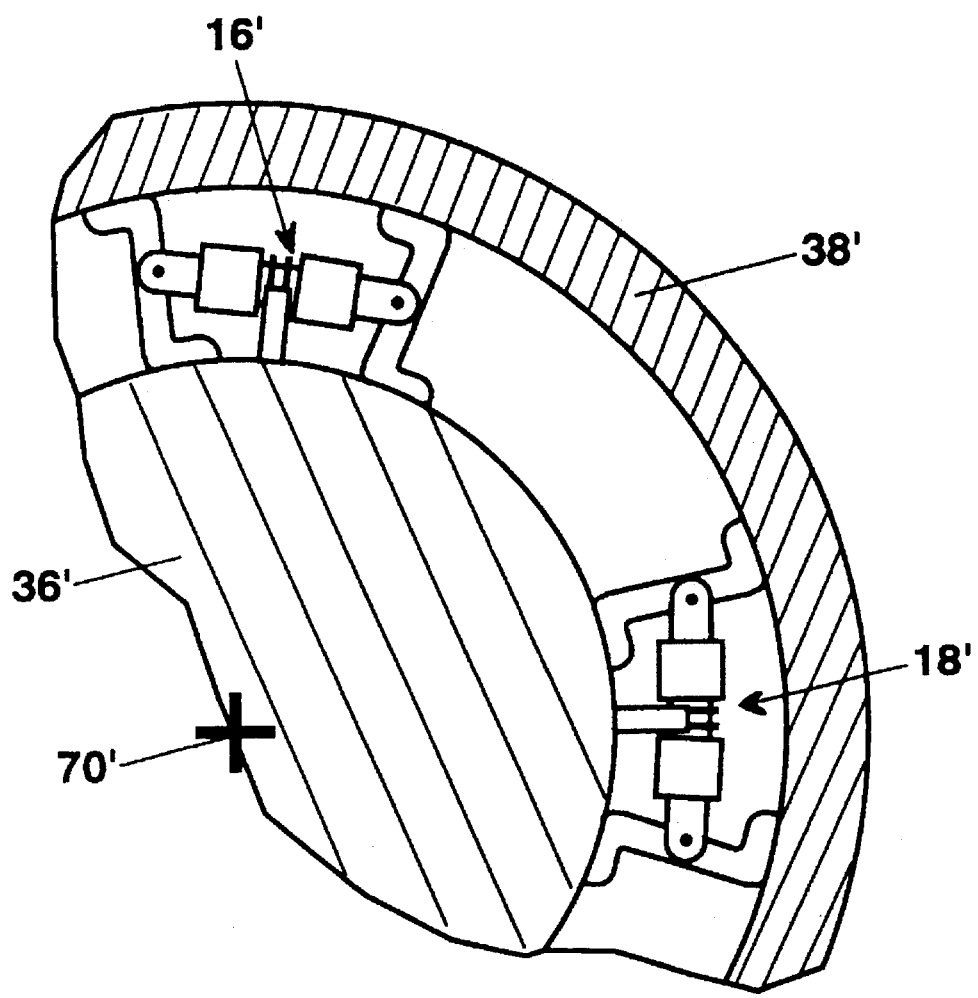

FIGS. 4 and 5 are partial section views taken substantially through planes indicated by section lines 4—4 and 5—5 in FIG. 3; and FIG. 6 is a partial transverse section view of a modified form of the motor system depicted in FIG. 3.

BRIEF DESCRIPTION OF THE PREFERRED EMBODIMENTS

Figure 1:
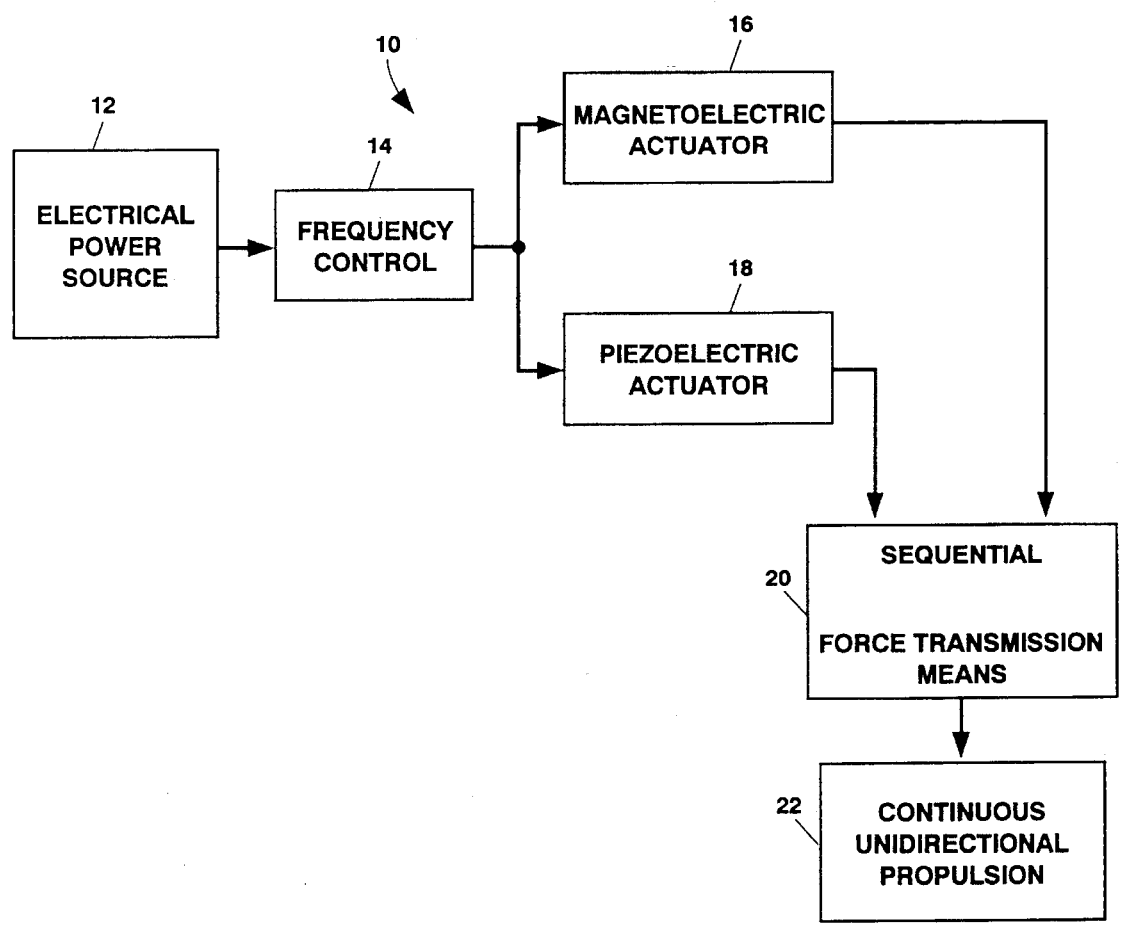
FIG. 1 is a block diagram schematically illustrating the motor system of the present invention.

Referring now to the drawing in detail, FIG. 1 diagrams a motor system 10 connected to a suitable electrical power source 12 from which electrical excitation current is supplied at some predetermined frequency through control 14 to at least one pair of actuators 16 and 18. The actuator 16 is of the magnetostrictive type which undergoes deformation when supplied by current. Supply of current at the same time to actuator 18 of the piezoelectric type causes it to undergo deformation in 90° out-of-phase relation to deformation of actuator 16. Such deformation of the actuators 16 and 18 produce corresponding push-pull forces as outputs fed to sequential force transmission means 20, as diagrammed in FIG. 1, through which continuous unidirectional propulsion is achieved as denoted by diagram block 22.

Figure 2:
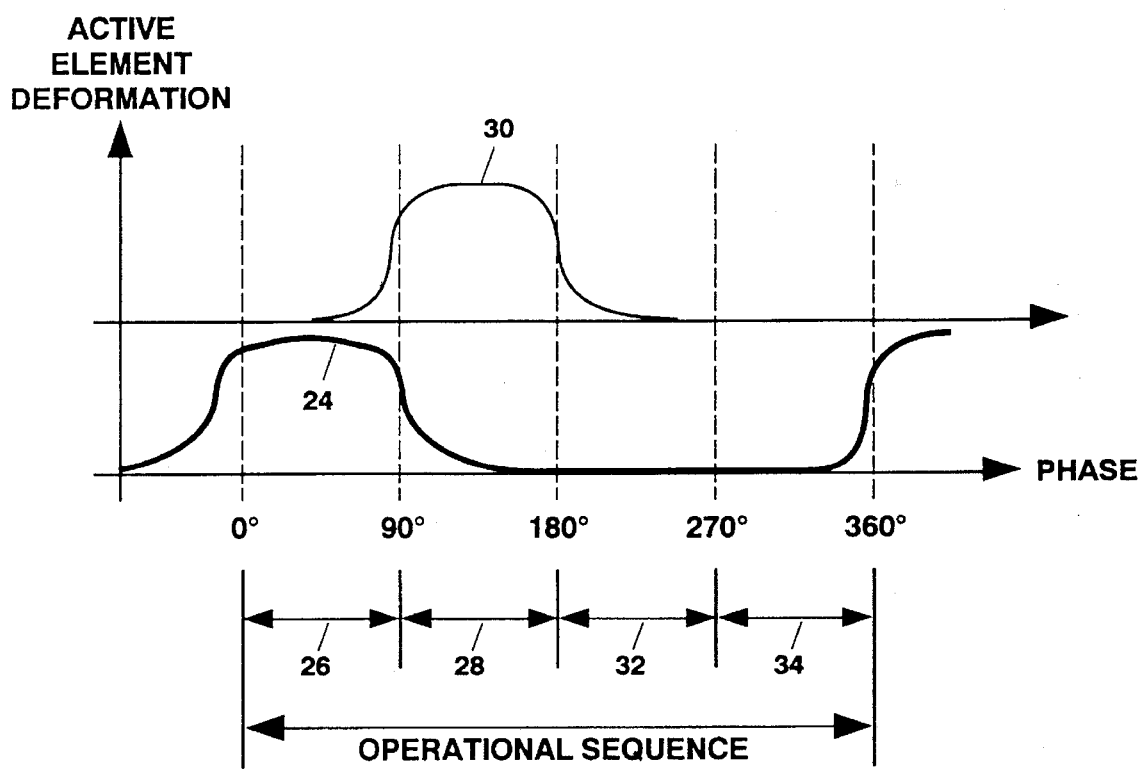
FIG. 2 is a graphical diagram depicting operational characteristics of the motor system diagrammed in FIG. 1.

As graphically diagrammed by way of example in FIG. 2, the magnetostrictive actuator 16 when energized by excitation current during one operational sequence undergoes expansive deformation as reflected by curve 24. As such expansive deformation of actuator 16 approaches completion of a first 90° cycle phase 26, expansive deformation of the piezoelectric actuator 18 occurs in 90° out-of-phase relation to that of actuator 16 during a second 90° cycle phase 28, as reflected by curve 30, in response to the excitation current being supplied thereto. When the magnetostrictive actuator 16 is deenergized as expansive deformation of actuator 18 approaches completion of the second cycle phase 28, contraction of actuator 16 occurs during a third cycle phase 32, followed by contraction of the deenergized piezoelectric actuator 18 during a fourth cycle phase 34 to complete one operational sequence.

In accordance with one embodiment of the invention, FIG. 3 illustrates the magnetostrictive and piezoelectric actuators 16 and 18 hereinbefore referred to in association with a motor system having a stator 36 and a linear driven member 38. The actuator 16 has an active element 40 made of magnetostrictive material surrounded by an electric excitation coil 42 to which current is supplied through cable 44 to effect its axial elongation or expansive deformation and contraction as hereinbefore described with respect to FIGS. 1 and 2. The resulting push and pull forces exerted by the magnetostrictive element 40 are transferred by axial end portions 46 and 48 of the actuator 16 to the force transmission means associated therewith, having a pair of rocker arms 50 and 52 pivotally connected by pins 54 to the end portions 46 and 48. Similarly, rocker arms are pivotally connected to opposite end portions of the actuator 18 having an active element 56 made of piezoelectric material as illustrated in FIG. 3, exerting push/pull forces on such rocker arms in response to axial elongation and contraction during the operational sequence as hereinbefore described with respect to FIGS. 1 and 2.

The force transmission means 20 in addition to the aforementioned rocker arms 50 and 52, includes a pair of one-way clutch rollers 58 and 60 for each rocker arm respectively received within bearing guide recesses 62 and 64 formed in parallel confronting surfaces of the stator 36 and driven member 38. The rollers 58 and 60 are respectively carried and thereby positioned within pocket formations 66 and 68, as shown in FIGS. 3, 4 and 5, connected to opposite radial ends of each rocket arm 50 and 52. The rollers are displaceable within their pocket formations 66 and 68 along roller supporting surfaces therein at an incline to confronting surfaces within the recesses 62 and 64 of the stator 36 and driven member 38 as shown in FIG. 3 for one-way engagement by the roller.

Thus, it will become apparent from FIG. 3 and the foregoing description that push forces exerted by the active element 40 or 56 of each actuator 16 and 18 during elongation will be transferred to their associated rocker arms 50 and 52 causing one-way engagement of roller 58 carried by rocker arm 52 with the stator 36 while roller 60 carried by rocker arm 50 engages the driven member 38 to transfer the push force thereto in one direction (leftward as viewed in FIG. 3). During contraction of the active elements 40 and 56, pull forces are transferred by the rollers 60 carried by the rocker arms 52 to the driven member 38 in the same direction (leftward as view in FIG. 3) while the rollers 58 carried by the rocker arms 50 engage the stator 36. Thus, unidirectional motion is sequentially imparted to the driven member 38 by both the push and pull forces exerted in response to elongation and contraction of the magnetostrictive and piezoelectric elements 40 and 56 of the actuators during the four cycle phases 26, 28, 32 and 34 of each operational cycle of the motor system 10, as hereinbefore described. Continuous linear movement is accordingly imparted to the driven member 38.

FIG. 6 illustrates another embodiment of the invention wherein the motor system is provided with plural pairs of magnetostrictive actuator 16' and piezoelectric actuator 18' similar in structure and operation to the actuators 16 and 18 hereinbefore described with respect to FIGS. 1–4. Further, the stator 36' is of cylindrical shape while the driven member 38' is a rotor in concentric relation to the stator. Accordingly, the confronting parallel surfaces of the stator 36' and rotor 38', engaged by the actuators, are cylindrical so that continuous unidirectional rotational movement is imparted to the rotor about the axis 70 of the stator.

Also according to yet other embodiments of the invention, each operational sequence having the two positive elongation phases 26 and 28 respectively performed by a pair of magnetostrictive and piezoelectric actuators as diagrammed in FIG. 2, is followed by two negative contraction phases, such as phases 32 and 34, performed by a different second pair of magnetostrictive and piezoelectric actuators. Accordingly, the first pair of actutors are disabled during the negative contraction phase in order to interrupt motion transfer therefrom. Transfer of motion impulses to the driven member from each actuator is thereby spread in time so that unwanted vibrations produced by motion transferring impulses is thereby reduced.

Obviously, other modifications and variations of the present invention may be possible in light of the foregoing teachings. It is therefore to be understood that within the scope of the appended claims the invention may be practiced otherwise than as specifically described.

What is claimed is:

1. In a motor connected to an electric power supply and having a stator, a driven member and actuator means operatively connected to said electrical power supply for unidirectional propulsion of the driven member, the improvement residing in: said actuator means including at least one pair of actuators, one of said pair of actuators having a magnetostrictive element, the other of said pair of actuators having a piezoelectric element; and force transmission means connected to said elements and operatively positioned relative to the stator and the driven member for engagement therewith to effect said unidirectional propulsion in response to cyclic elongation and contraction of the elements.

2. The combination as defined in claim 1 wherein said force transmission means includes a pair of rocker arms pivotally connected to each of the elements respectively at opposite ends of the actuators and roller means carried by each of said rocker arms for unidirectional force transmitting engagement with the stator and the driven member.

3. The combination as defined in claim 2 wherein said driven member is a rotor.

4. The combination as defined in claim 2 wherein linear movement is imparted to said driven member.

5. In combination with the motor as defined in claim 1, control means connected to the power supply for effecting said cyclic elongation and contraction of the elements of the actuators respectively in out-of-phase relation to each other to establish a four cycle operational sequence.

6. In a motor having at least one pair of actuators, a power supply and control means connecting the power supply to the actuators for cyclic energization thereof, the improvement residing in: one of said actuators having a magnetostrictive element undergoing deformation in response to said cyclic energization of the actuators; and the other of said actuators having a piezoelectric element undergoing deformation in out-of-phase relation to the deformation of the magnetostrictive element.

7. The motor as defined in claim 6, including: force propulsion means connected to the magnetostrictive and piezoelectric elements of the actuators for conversion of said deformations thereof into continuous unidirectional movement.

8. The motor as defined in claim 7, wherein said continuous unidirectional movement is established by elongation and contraction of the magnetostrictive and piezoelectric elements in opposite directions during four-cycle operational sequences.

9. The motor as defined in claim 8, wherein the force propulsion means includes a pair of rocker arms pivotally connected to each of the magnetostrictive and piezoelectric elements respectively at opposite ends thereof and one-way engaging roller means carried by each of said rocker arms for unidirectional force transmission.

10. The motor as defined in claim 6, including: a pair of rocker arms pivotally connected to each of the magnetostrictive and piezoelectric elements respectively at opposite ends thereof and one-way engaging roller means carried by each of said rocker arms for unidirectional force transmission.

11. In a motor having a stator, a driven member and actuator means for unidirectional propulsion of the driven member, the improvement residing in: said actuator means having at least two pairs of actuators, each of said pairs of actuators having a magnetostrictive element and a piezoelectric element; force transmission means connected to said elements and operatively positioned for engagement with the stator and with the driven member to, effect said unidirectional propulsion thereof in response to cyclic elongation and contraction of the elements; and power operated means for effecting said cyclic elongation and contraction of the elements of the actuators respectively in out-of-phase relation to each other to establish a four cycle operational sequence having two elongation phases performed by one of said two pairs of the actuators and two contraction phases performed by the other of the two pairs of the actuators.

12. The combination as defined in claim 11 wherein said force transmission means includes: a rocker arm pivotally connected to each of said elements and one-way clutch rollers carried by said rocker arm, said rocker arm having roller supporting surfaces on which the rollers are displaceable into engagement with confronting surfaces on the stator and the driven member.

13. The combination as defined in claim 12 wherein the rocker arm has pocket formations within which the roller supporting surfaces are formed at an incline to the confronting surfaces on the stator and the driven member to thereby effect said engagement of the rollers.

* * * * *